(12) United States Patent  
Aoshima

(10) Patent No.: US 8,270,412 B2
(45) Date of Patent: Sep. 18, 2012

(54) NETWORK RELAY DEVICE AND RING NETWORK

(75) Inventor: Kenji Aoshima, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 251 days.

(21) Appl. No.: 12/659,174

(22) Filed: Feb. 26, 2010

(65) Prior Publication Data

US 2010/0284416 A1  Nov. 11, 2010

(30) Foreign Application Priority Data

May 7, 2009 (JP) ................................. 2009-112467

(51) Int. Cl.
 *H04L 12/28* (2006.01)
 *H04L 12/56* (2006.01)
(52) U.S. Cl. ...................................... 370/395.3; 370/389
(58) Field of Classification Search .................. 370/389, 370/392, 395.3
 See application file for complete search history.

(56) References Cited

U.S. PATENT DOCUMENTS 8,199,756 B2  6/2012 Sugimoto
2007/0258359 A1* 11/2007 Ogasawara et al. ........... 370/218
2008/0025207 A1  1/2008 Akahane et al.
2008/0232388 A1  9/2008 Sugimoto
2008/0285555 A1* 11/2008 Ogasahara .................... 370/389
2009/0185566 A1*  7/2009 Ogasahara et al. ......... 370/395.3

FOREIGN PATENT DOCUMENTS

JP  2007-324688  12/2007
JP  2008-236306 (A)  10/2008

OTHER PUBLICATIONS

Notification of Reason(s) for Refusal dated Jul. 24, 2012, with English translation.

* cited by examiner

*Primary Examiner* — Chuong T Ho
(74) *Attorney, Agent, or Firm* — McGinn IP Law Group, PLLC

(57) ABSTRACT

A network relay device constituting a network includes a transmit/receive unit having plural ports; an FDB for storing as its registered contents at least a port identifier for identifying each of the plural ports, or an LAG port into which are grouped a specified number of the plural ports, a terminal identifier for identifying a terminal, and an FDB_ID for being associated with both the port identifier and the terminal identifier; and an FDB_ID table for storing the FDB_ID associated with the port identifier. When the registered contents of a specified port or LAG port stored in the FDB are erased, the stored FDB_ID associated with the port identifier identifying that port or LAG port is rewritten as another value.

8 Claims, 4 Drawing Sheets

20 FRAME DETERMINATION UNIT  60 FRAME GENERATION UNIT
40 FORWARDING UNIT            70 PORT CONTROL UNIT
50 CENTRAL CONTROL UNIT       80 RING PROTOCOL CONTROL UNIT

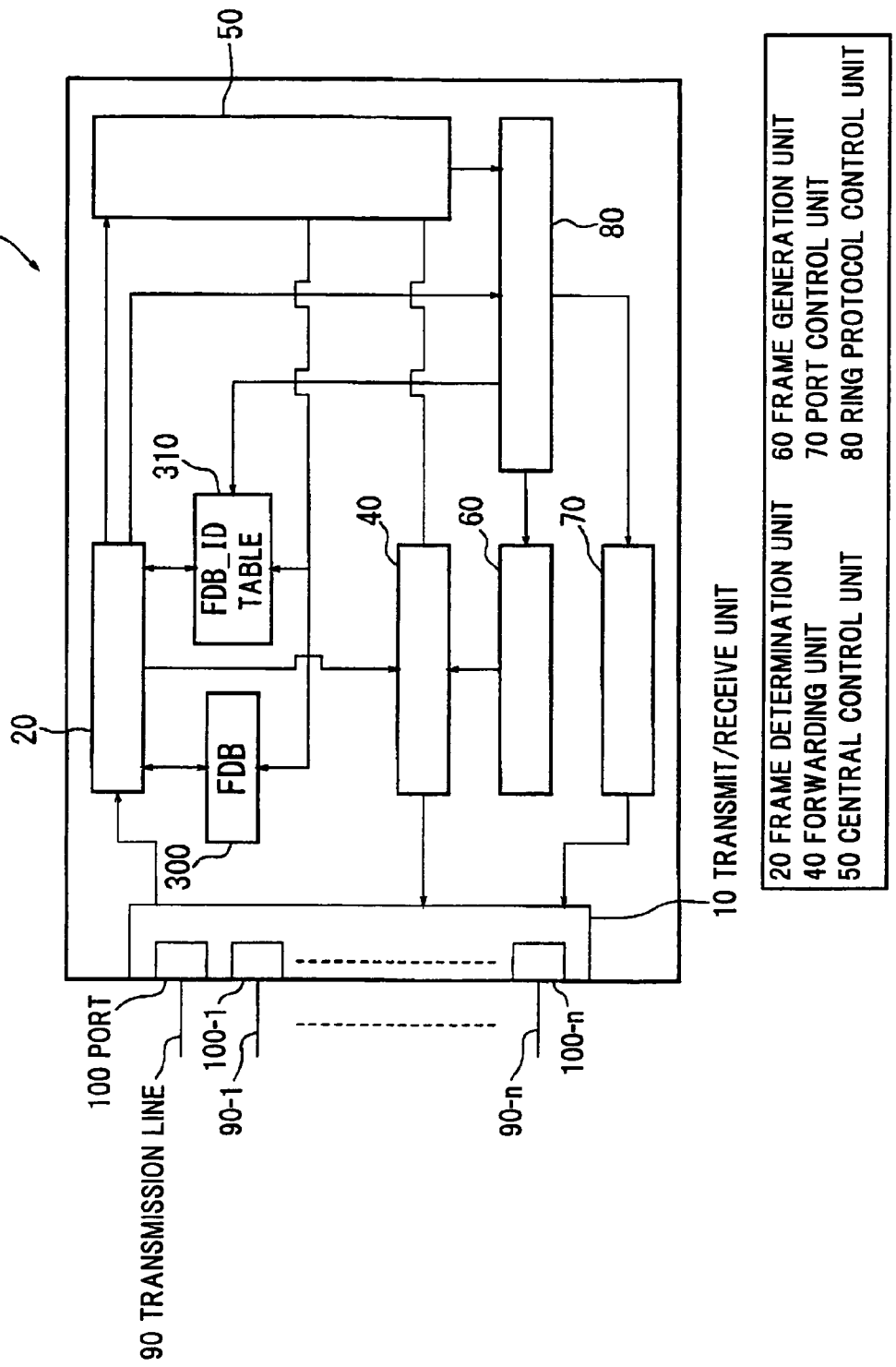

*FIG.2A*

| TIMER | MAC Address | FDB_ID | LAG/Port_ID |
|---|---|---|---|
| t1 | MAC A | 0 | LAG1 |
| t1 | MAC B | 0 | LAG2 |
| t1 | MAC C | 0 | LAG3 |
| t1 | MAC D | 0 | LAG3 |

| LAG/Port_ID | FDB_ID |
|---|---|
| LAG1 | 0 |
| LAG2 | 0 |
| LAG3 | 0→1 |
| ------ | ------ |
| LAG12 | 0 |

310

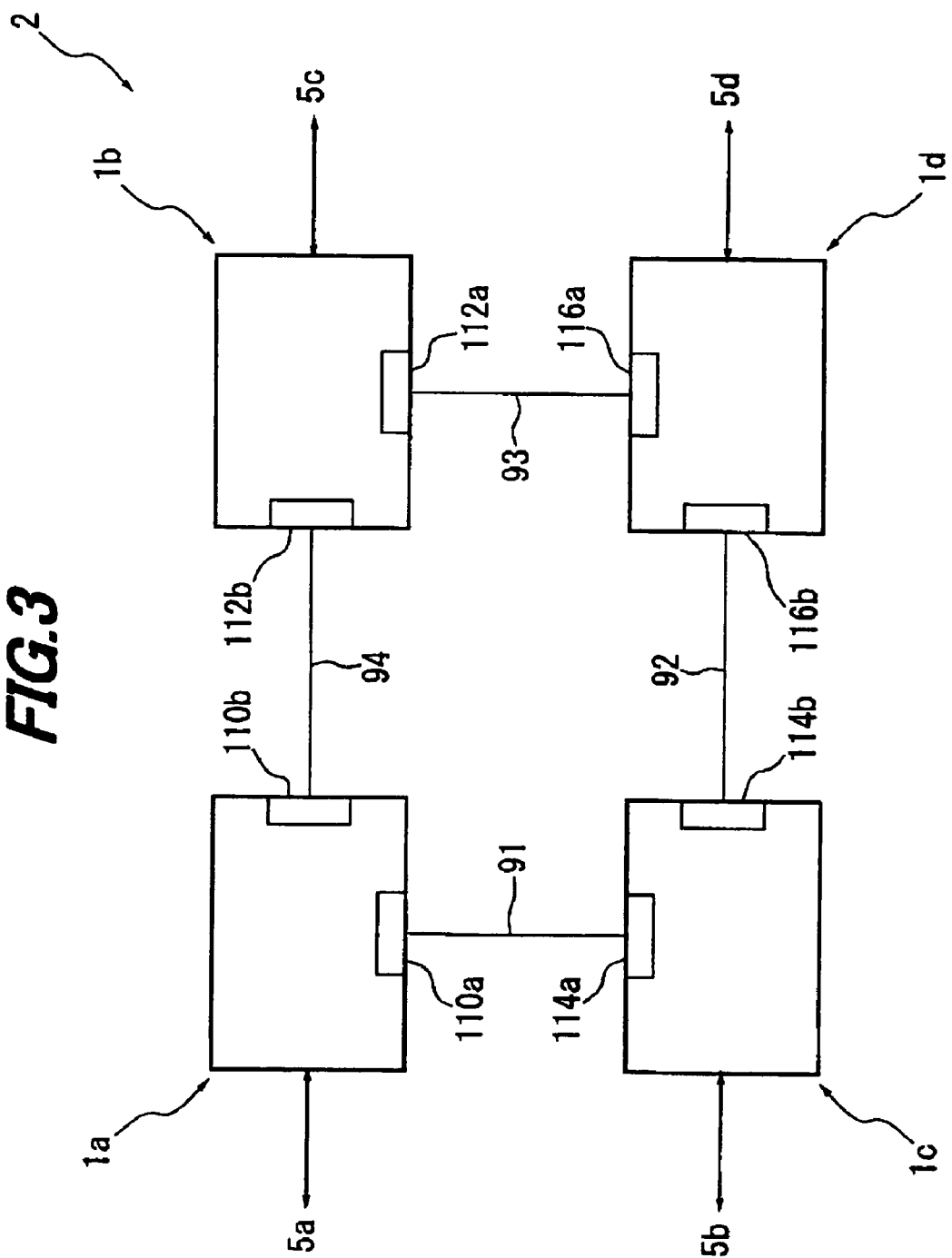

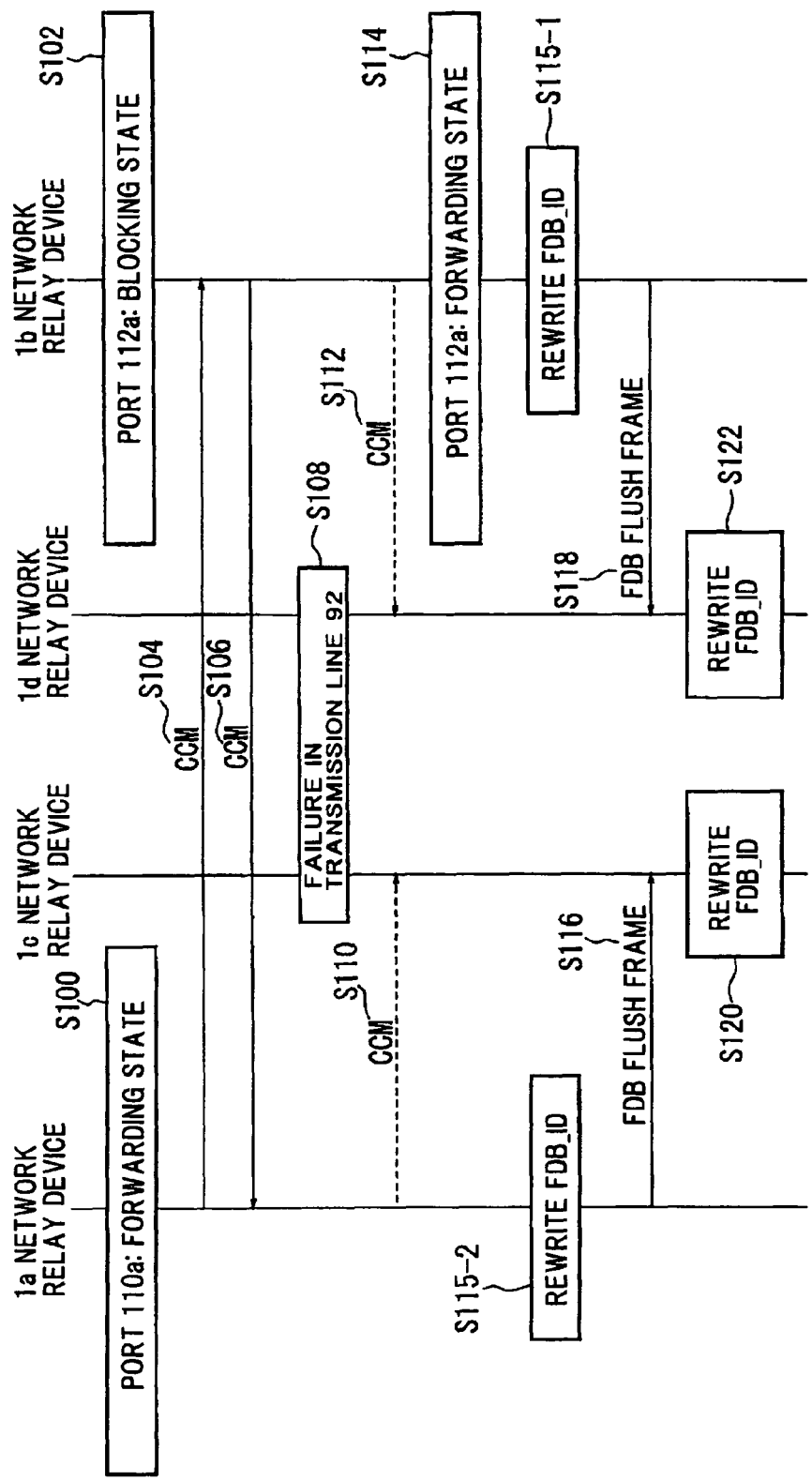

NETWORK RELAY DEVICE AND RING NETWORK

The present application is based on Japanese patent application No. 2009-112467 filed on May 7, 2009, the entire contents of which are incorporated herein by reference.

BACKGROUND OF THE INVENTION

1. Field of the Invention

The present invention relates to a network relay device and a ring network. In particular, it relates to a network relay device with a forwarding database (FDB) and a ring network.

2. Description of the Related Art

Conventionally, a switch is known that has a packet kind determining unit for determining a frame kind from header information extracted from a received frame, and extracting a destination MAC address from the header information, a database for associating the destination MAC address with an output port, a packet destination determining unit for determining the output port from the database using the destination MAC address extracted by the packet kind determining unit, a packet forwarding unit for extracting the header information from the received frame and transmitting it to the packet kind determining unit, and for receiving the output port from the packet destination determining unit and transmitting the frame from that output port, and a generating unit for generating a receiver searching message, in which when detecting failure in a downstream network, an entry in the database is flushed to transmit the receiver searching message to the downstream network.

The above configured switch can, even in case of failure in a ring network, restore undesired traffic for a short period of time, and minimize deterioration in security.

Refer to JP-A-2007-324688, for example.

However, applying a ring network with that switch disclosed by JP-A-2007-324688 to, for example, a large capacity communication network backbone (broadband network) connecting telecommunications carriers, leads to large amounts of data transmitted through the backbone, and therefore large amounts of information registered in an FDB of that switch. This requires a long period of time of erasing the information registered in the FDB according to FDB flush frames, and may therefore affect the period of time of route switching in case of failure in the ring network.

SUMMARY OF THE INVENTION

Accordingly, it is an object of the present invention to provide a network relay device and a ring network, which can perform essentially the same function as the function of erasing the registered contents of an FDB, to shorten the period of time until performing essentially the same function as the function of erasing the registered contents of the FDB.

(1) According to one embodiment of the invention, a network relay device constituting a network comprises:

a transmit/receive unit having plural ports;

an FDB for storing as its registered contents at least a port identifier for identifying each of the plural ports, or an LAG port into which are grouped a specified number of the plural ports, a terminal identifier for identifying a terminal, and an FDB_ID for being associated with both the port identifier and the terminal identifier; and an FDB_ID table for storing the FDB_ID associated with the port identifier, wherein when the registered contents of a specified port or LAG port stored in the FDB are erased, the stored FDB_ID associated with the port identifier identifying that port or LAG port is rewritten as another value.

In the above embodiment (1), the following modifications and changes can be made.

(i) The network relay device further comprises a forwarding unit for forwarding information, the forwarding unit forwarding the information to the transmit/receive unit as a unicast when the FDB_ID stored in the FDB_ID table and associated with the port identifier stored in the FDB and associated with destination information contained in that information is being stored in the FDB, or the forwarding unit forwarding the information to the transmit/receive unit as a flooding when that FDB_ID is not being stored in the FDB.

(ii) An FDB_ID stored in the FDB_ID table and associated with a port identifier identifying one port or LAG port of the transmit/receive unit having received the information is registered in the FDB, together with source information indicative of a source of the information received in the one port or LAG port.

(iii) When one port or LAG port of the plural ports receives erase command information for commanding an erasure of the contents stored in the FDB, the FDB_ID value stored in the FDB_ID table and associated with the port identifier identifying the one port or LAG port is rewritten as the another value.

(2) According to another embodiment of the invention, a ring network comprises:

plural network relay devices each comprising a transmit/receive unit having plural ports; an FDB for storing as its registered contents at least a port identifier for identifying each of the plural ports, or an LAG port into which are grouped a specified number of the plural ports, a terminal identifier for identifying a terminal, and an FDB_ID for being associated with both the port identifier and the terminal identifier; and an FDB_ID table for storing the FDB_ID associated with the port identifier, wherein when the registered contents of a specified port or LAG port stored in the FDB are erased, the stored FDB_ID associated with the port identifier identifying that port or LAG port is rewritten as another value.

In the above embodiment (2), the following modifications and changes can be made.

(iv) When one network relay device of the plural network relay devices transmits erase command information for commanding an erasure of the contents stored in the FDB of each of the other network relay devices, from one port or LAG port of that one network relay device to another port or LAG port of each of the other network relay devices, the other network relay devices each receive the erase command information, and rewrite the FDB_ID value as the another value.

Points of the Invention

According to the embodiments of the invention, since, when determining that a communication failure has occurred in the network, the network relay device rewrites an FDB_ID value associated with the registered contents to be erased into another value without erasing the registered contents of the FDB, the new FDB_ID value allows a quick start of source address learning and destination address retrieval. That is, the network using the network relay device allows essentially the same function as the function of erasing the registered contents to be realized by rewriting an FDB_ID value in the FDB_ID table into another value, even without erasing the registered contents of the FDB, and the period of time until performing essentially the same function as the function of erasing the registered contents of the FDB can therefore be shortened even when applying the network with the network relay device to a backbone. Accordingly, the network can, even in the event of a communication failure in the network, reduce the effect on the period of time of route switching (i.e. the effect causing a long period of time of route switching and therefore requiring a long period of time of restoring the communication failure).

BRIEF DESCRIPTION OF THE DRAWINGS

The preferred embodiments according to the invention will be explained below referring to the drawings, wherein:

FIG. 1 is a block diagram showing a function and construction of a network relay device in an embodiment according to the invention;

FIG. 2A is a diagram showing an FDB data configuration in the embodiment according to the invention;

FIG. 2B is a diagram showing an FDB_ID table data configuration in the embodiment according to the invention;

FIG. 3 is a diagram showing a network configuration in the embodiment according to the invention; and FIG. 4 is a diagram showing flows of operation of the network in the event of a failure in the network in the embodiment according to the invention.

DETAILED DESCRIPTION OF THE PREFERRED EMBODIMENTS

FIG. 1 shows one example of a function and construction of a network relay device in an embodiment according to the invention. Also, FIG. 2A shows one example of an FDB data configuration in the embodiment according to the invention, and FIG. 2B shows one example of an FDB_ID table data configuration in the embodiment according to the invention.

In the event of a failure in a network transmission line, network relay device 1 in this embodiment can, even if actually not erasing the contents stored (herein, referred to as "the registered contents") in a forwarding database (FDB), perform essentially the same function as the function of erasing the registered contents of the FDB, to shorten the period of time until performing essentially the same function as the function of erasing the registered contents of the FDB. Specifically, the network relay device 1 in this embodiment may be used in a ring network constructed of plural network relay devices connected in a ring shape. For example, the network relay device 1 is a switching hub.

Here, the ring-shaped connection of plural network relay devices allows redundancy in the ring network in case of failure in the ring network. The network relay devices 1 included in the ring network have substantially the same function and configuration. Below is therefore described one network relay device 1.

Network Relay Device 1 Construction

The network relay device 1 in this embodiment includes a transmit/receive unit 10 for receiving information (e.g. a frame) from an external terminal, an external network relay device and/or an external network, or providing information from the network relay device 1 to an external terminal, an external network relay device and/or an external network; a frame determination unit 20 for determining the contents of the information received in the transmit/receive unit 10; an FDB 300 for storing path information; an FDB_ID table 310; a forwarding unit 40 for forwarding specified information to a specified port; a frame generation unit 60 for generating connection confirmation information or erase command information based on a determined result of the frame determination unit 20; a port control unit 70 for controlling the state of the transmit/receive unit 10; a ring protocol control unit 80 for controlling the operation of the frame generation unit 60 and of the port control unit 70, and a central control unit 50 for controlling the operation of the FDB 300, the forwarding unit 40, and of the ring protocol control unit 80.

Transmit/Receive Unit 10

The transmit/receive unit 10 has plural ports (e.g. port 100, port 100-1, . . . port 100-$n$, where n is positive integers) communicatably connected to an external terminal, an external network relay device, and/or an external network. The plural ports are connected to transmission lines, respectively, for transmitting/receiving information between them and the external terminal, the external network relay device and/or the external network. Specifically, the port 100 is connected to a transmission line 90, and the port 100-1 is connected to a transmission line 90-1. The ports 100-$n$ are likewise connected to transmission lines 90-$n$, respectively. Also, each of the plural ports is provided to be able to be transitioned into either a forwarding state of relaying information, or a blocking state of disconnecting the relay of information.

Here, in this embodiment, the plural transmission lines each are constructed from an optical fiber, for example, and configured to include at least two transmission lines. That is to say, although for convenience of description, each transmission line is depicted as being one line in FIG. 1, the plural transmission lines each are configured to include a two-way (i.e. two directions of transmitting and receiving) transmission line, to allow full duplex communications between the external terminal, the external network relay device, and/or the external network and the network relay device 1.

The transmit/receive unit 10 provides the information received from the external terminal, the external network relay device and/or the external network, from each of the plural ports to the frame determination unit 20. Also, the transmit/receive unit 10 provides the information forwarded from the forwarding unit 40 to a specified port, from that port to the specified external terminal, the external network relay device and/or the external network. Further, the transmit/receive unit 10 is controlled by the port control unit 70, to transition each of the plural ports into either a forwarding state, or a blocking state.

FDB 300

Referring to FIG. 2A, the FDB 300 stores at least a port identifier (e.g. an LAG_ID or a Port_ID) for uniquely identifying each of plural ports, a terminal identifier (e.g. an MAC address) for uniquely identifying an external terminal connected to that network relay device 1, and an FDB_ID that is an identifier associated with both the port identifier and the terminal identifier. Also, the FDB 300 can further store a VLAN_ID (VID) to be associated with a port identifier of a port having received information.

That is, the FDB 300 stores at least a correspondence between each of plural ports and a terminal identifier. For example, the FDB 300 stores a source MAC address of information received in transmit/receive unit 10, and associated with a port identifier for identifying a port having received that information. In FIG. 2A, the FDB 300 stores, for each row, an MAC address (e.g. an MAC A, an MAC B, etc.) as an "MAC address," an FDB_ID (e.g. a "0") as an "FDB_ID," and an LAG_ID (e.g. an "LAG3," etc.) as an "LAG/Port_ID." In the "TIMER" column, a "11," for example, is stored when an MAC address is registered, and "1" is subtracted from the stored value when the information stored in that row are not received for a predetermined period of time (i.e. aging time), and the registered contents in that row are erased when that stored value becomes "0."

Also, the Port_ID is a port identifier for being assigned to each of plural ports, and uniquely identifying each of plural ports. The link aggregation group (LAG) refers to a bundle of plural transmission lines to be used as one virtual transmission line. The LAG_ID is a port identifier for being assigned to one LAG port into which are grouped plural ports to be connected with those plural transmission lines, respectively, and uniquely identifying the LAG port. When ports are used individually, Port_IDs are used as port identifiers. When ports are used for an LAG an LAG_ID is used as a port identifier.

FDB_ID Table 310

Referring to FIG. 2B, the FDB_ID table 310 stores an FDB_ID to be associated with a port identifier for uniquely identifying each of plural ports of transmit/receive unit 10. As one example, in FIG. 2B, an FDB_ID is associated for each of twelve LAGs.

Frame Determination Unit 20

The frame determination unit 20 references the contents of information received from the transmit/receive unit 10. The frame determination unit 20 first determines whether or not that information is connection confirmation information or erase command information.

The connection confirmation information refers to, for example, frames to be transmitted at a predetermined time interval (e.g. a few milliseconds), for monitoring whether or not communications are possible between one port of network relay device 1 and another port of the external network relay device or the external terminal. For example, the connection confirmation information frame may use a continuity check message (CCM) frame specified in ITU-T Y. 1731 and IEEE802.1ag. Also, the erase command information refers to information for commanding an erasure of the stored contents of FDB 300, and is FDB flush frames, for example.

When determining that the information received from transmit/receive unit 10 is not the connection confirmation information or the erase command information, but a normal data frame, the frame determination unit 20 operates as follows.

Source Information Learning

The frame determination unit 20 retrieves information (i.e., FDB_ID stored in the FDB_ID table 310) from the FDB_ID table 310 with a port identifier of a port having received that information. The frame determination unit 20 registers in the FDB 300 an FDB_ID stored in the FDB_ID table 310, source information (i.e. source MAC address) of the information received in the port, and that port identifier.

Also, when all contents (i.e. all of the FDB_ID, source information, and port identifier) to register have already been registered in the FDB 300, the frame determination unit 20 renews the "TIMER" value in the FDB 300 (for example, renews the "TIMER" value as a "11").

Also, when of the contents to register in the FDB 300, the MAC address and the FDB_ID have already been registered in the FDB 300, and a different LAG/Port_ID has been registered in the FDB 300, the frame determination unit 20 rewrites the LAG/Port_ID as a "station move" (i.e. connection (destination port) switching).

Also, when of the contents to register in the FDB 300, the MAC address and the LAG/Port_ID have already been registered in the FDB 300, and a different FDB_ID has been registered in the FDB 300, the frame determination unit 20 rewrites the FDB_ID.

Destination Retrieval

Also, the frame determination unit 20 retrieves FDB_ID and LAG/Port_ID stored in the FDB300 from the FDB 300 with destination information (i.e. a destination MAC address) contained in information received from the transmit/receive unit 10. When that destination information is not stored in the FDB 300 and the destination of that information is therefore unknown, the frame determination unit 20 provides that information to the forwarding unit 40 as a flooding.

On the other hand, when that destination information is stored in the FDB 300, the frame determination unit 20 retrieves information (i.e., FDB_ID stored in the FDB_ID table 310) from the FDB_ID table 310 with a port identifier of a port having received that information. When an FDB_ID stored in the FDB_ID table 310 matches an FDB_ID value associated with the destination information and stored in the FDB 300, the frame determination unit 20 determines a port as the forwarding destination identified by the port identifier associated with the destination information retrieved from the FDB 300. The frame determination unit 20 then provides the port identifier for identifying the determined forwarding destination port, to the forwarding unit 40 as the forwarding destination port identifier.

Also, when an FDB_ID stored in the FDB_ID table 310 does not match an FDB_ID value associated with the destination information and stored in the FDB 300 and the destination of information received from the transmit/receive unit 10 is therefore unknown, the frame determination unit 20 provides that information to the forwarding unit 40 as a flooding.

A Case of Receiving Connection Confirmation Information from Transmit/Receive Unit 10

The frame determination unit 20 references an Ethernet type and/or an operation code of the information frame received from the transmit/receive unit 10 and thereby determines whether or not that information frame is the connection confirmation information frame, or the erase command information, i.e. FDB flush frame. When that information is the connection confirmation information, the frame determination unit 20 provides to the ring protocol control unit 80 the information indicative of having received the connection confirmation information.

A Case of Receiving Erase Command Information from Transmit/Receive Unit 10

When determining that the information received from transmit/receive unit 10 is the erase command information, the frame determination unit 20 operates FDB_ID table 310, to rewrite an FDB_ID value stored in FDB_ID table 310 into another value. That is, the frame determination unit 20 rewrites an FDB_ID value associated with a port identifier for a port having received that information and stored in the FDB_ID table 310, for example, rewrites a "0" as a "1" (see LAG3 in FIG. 2B).

Forwarding Unit 40

The forwarding unit 40 receives information from the frame determination unit 20. When receiving a forwarding destination port identifier from the frame determination unit 20, the forwarding unit 40 provides that information to a port identified by the forwarding destination port identifier. Also, when receiving that information from the frame determination unit 20 as a flooding, the forwarding unit 40 forwards that information to all ports but a port having received that information.

Ring Protocol Control Unit 80

The ring protocol control unit 80 controls a port of plural ports of transmit/receive unit 10, which is connected to the ring network, and which is set as the "master control port" or the "slave control port."

The "master control port" or the "slave control port" is set by a network administrator implementing communication from an administrative terminal to network relay device 1 in this embodiment, to transmit a command to set one port of the transmit/receive unit 10 of the network relay device 1 as the "master control port" or the "slave control port." The central control unit 50 provided in the network relay device 1 receives that command from the administrative terminal, and commands the ring protocol control unit 80 to set the specified port as the "master control port" or the "slave control port." The ring protocol control unit 80 having received that command sets the specified port of the transmit/receive unit 10 as the "master control port" or the "slave control port."

Here, in a normal state (i.e. with no communication failure occurring in the ring network), when the specified port is set as the "master control port," the ring protocol control unit 80 controls the port control unit 70 to maintain that specified port in the forwarding state. On the other hand, when the specified port is set as the "slave control port," the ring protocol control unit 80 controls the port control unit 70 to maintain that specified port in the blocking state. The ring protocol control unit 80 then controls the frame generation unit 60, to cause the frame generation unit 60 to provide connection confirmation information from the "master control port" or the "slave control port" to the ring network at a predetermined time interval (i.e. at a regular interval).

Also, when the frame determination unit 20 receives connection confirmation information from outside, the frame determination unit 20 provides to the ring protocol control unit 80 the information indicative of having received the connection confirmation information. After having received the information indicative of having received the connection confirmation information from the frame determination unit 20, when receiving no information from the frame determination unit 20 indicative of having received next connection confirmation information within a predetermined period of time, the ring protocol control unit 80 determines that a failure has occurred in the ring network.

When it is determined that a failure has occurred in the ring network, and when the specified port is set as the "slave control port," the ring protocol control unit 80 controls the port control unit 70 to transition the "slave control port" from the blocking state into a forwarding state. The port control unit 70 is controlled by the ring protocol control unit 80, to transition the "slave control port" from the blocking state into a forwarding state.

Because a failure has occurred in the ring network, the ring protocol control unit 80 then controls the frame generation unit 60, to cause the frame generation unit 60 to generate erase command information. The ring protocol control unit 80 then transmits the frame generation unit 60 generated erase command information from the "master control port" or the "slave control port" of the transmit/receive unit 10 to the ring network.

Further, the ring protocol control unit 80 controls FDB_ID table 310, to rewrite an FDB_ID associated with a port identifier for identifying the "master control port" or the "slave control port" into another value.

Port Control Unit 70

The port control unit 70 is controlled by the ring protocol control unit 80, to control the states of the ports constituting the ring network. That is, the port control unit 70 is controlled by the ring protocol control unit 80, to transition each of the plural ports of the transmit/receive unit 10 into either a forwarding state, or a blocking state. Also, the port control unit 70 can maintain each of the plural ports in either a forwarding state, or a blocking state.

Frame Generation Unit 60

The frame generation unit 60 is controlled by the ring protocol control unit 80, to generate the connection confirmation information or the erase command information. The frame generation unit 60 provides the generated connection confirmation information or the erase command information to the forwarding unit 40. The forwarding unit 40 transmits the connection confirmation information or the erase command information received from the frame generation unit 60 to a specified port of an external terminal via the transmit/receive unit 10.

Operation of Ring Protocol Control Unit so

When determining that a failure has occurred in the ring network, the ring protocol control unit 80 controls the port control unit 70 to transition that one port of the network relay device 1 from the blocking state into a forwarding state, or when in a forwarding state, maintain the one port in the forwarding state.

Central Control Unit 50

Central control unit 50 is equipped with software, which controls operation of each unit included in the network relay device 1 (such as FDB 300, forwarding unit 40, and ring protocol control unit 80). Also, after the frame determination unit 20 rewrites an FDB_ID value associated with a port identifier and stored in the FDB_ID table 310 (for example, rewrites an FDB_ID value "0" as a "1"), the central control unit 50 can, before a predetermined aging time passing, erase the registered contents stored in the FDB 300, which are associated with the FDB_ID prior to the rewriting (for example, "0") associated with that port identifier.

Specifically, the frame determination unit 20 rewrites an FDB_ID value associated with a specified port identifier and stored in the FDB_ID table 310. The frame determination unit 20 then informs the central control unit 50 of having rewritten the FDB_ID value. In response to that information, the central control unit 50 uses a Clear FDB command contained in its software, to control the FDB 300, and erase the registered contents stored in the FDB 300, which are associated with the FDB_ID value prior to the rewriting associated with that port identifier.

Network 2 Configuration

FIG. 3 shows a network configuration in the embodiment according to the invention.

Network 2 in this embodiment is a layer-2 ring network, and includes plural network relay devices in this embodiment. Specifically, the network 2 includes network relay devices (i.e. network relay devices 1a to 1d) in this embodiment. The number of network relay devices included in the network 2 is not limited to four.

In the network 2, a port 110a of the network relay device 1a is connected to a port 114a of the network relay device is by a transmission line 91. Here, one port 110a of plural ports provided in transmit/receive unit 10 of the network relay device 1a, is referred to as "master control port" in this embodiment.

Also, a port 114b of the network relay device 1c is connected to a port 116b of the network relay device 1d by a transmission line 92. A port 116a of the network relay device 1d is connected to a port 112a of the network relay device 1b by a transmission line 93. Also, a port 112b of the network relay device 1b is connected to a port 110b of the network relay device 1a by a transmission line 94. Here, one port 112a of the plural ports provided in transmit/receive unit 10 of the network relay device 1b, is referred to as "slave control port" in this embodiment. The network relay device 1a is connected to an external network 5a. The network relay device 1b is connected to an external network 5c. The network relay device 1c is connected to an external network 5b. The network relay device 1d is connected to an external network 5d.

In a normal state, the slave control port is set into a blocking state. This allows the network 2 to form no logical loop, although forming a physical loop. Accordingly, the information from the network relay devices 1c and 1d is provided through the transmission line 91 to external network 5a. In the normal state, the network relay device 1a regularly provides connection confirmation information from its master control port to the slave control port. Likewise, the network relay device 1b regularly provides connection confirmation information from its slave control port to the master control port. These connection confirmation information allow the network relay devices 1a and 1b each to confirm the communication connection therebetween.

FIG. 4 shows one example of flows of operation of the network in the event of a failure in the network in the embodiment according to the invention.

Specifically, FIG. 4 shows one example of flows of operation of the network 2 shown in FIG. 3 in the event of a communication failure in a transmission line (e.g. transmission line 92) between the network relay devices 1a and 1b.

First, in a normal state, a master control port provided in transmit/receive unit 10 of the network relay device 1a is controlled by port control unit 70 to be set into a forwarding state (step S100). Also, in the normal state, a slave control port provided in transmit/receive unit 10 of the network relay device 1b is controlled by port control unit 70 to be set into a blocking state (step S102). Frame generation unit 60 of the network relay device 1a regularly generates CCM, and its forwarding unit 40 regularly transmits this CCM to the network relay device 1b (S104). Likewise, the network relay device 1b regularly transmits CCM to the network relay device 1a (S106).

It is then assumed that a communication failure occurs between the network relay devices 1a and 1b, for example, in transmission line 92 (S108). In this case, the CCM transmitted from the network relay device 1a to 1b does not arrive at the network relay device 1b (S110). Likewise, the CCM transmitted from the network relay device 1b to 1a does not arrive at the network relay device 1a (S112). This causes ring protocol control units 80 of the network relay devices 1a and 1b to detect no CCMs received from the network relay devices 1b and 1a, respectively, i.e. a communication failure caused in the network. Based on this, the ring protocol control unit 80 of the network relay device 1b controls its port control unit 70 to transition the slave control port from the blocking state into a forwarding state (S114).

Also, the ring protocol control unit 80 of the network relay device 1a controls its FDB_ID table 310 to rewrite an FDB_ID associated with a port identifier for identifying the "master control port" (S115-2). Also, the ring protocol control unit 80 of the network relay device 1b controls its FDB_ID table 310 to rewrite an FDB_ID associated with a port identifier for identifying the "slave control port" (S115-1).

The frame generation unit 60 of the network relay device 1a then generates, from its master control port, erase command information which commands an erasure of the registered contents of FDB 300 provided in each network relay device constituting network 2. Subsequently, the forwarding unit 40 of the network relay device 1a transmits the erase command information (i.e. FDB flush frame) generated by its frame generation unit 60 from one specified port 110a shown in FIG. 3 to another port 114a of another network relay device 1c (S116).

Likewise, the frame generation unit 60 of the network relay device 1b generates, from its slave control port, erase command information which commands an erasure of the registered contents of FDB 300 provided in each network relay device constituting network 2. Subsequently, the forwarding unit 40 of the network relay device 1b transmits the FDB flush frame generated by its frame generation unit 60 from its port 112a to port 116a of another network relay device 1d (S118).

Frame determination unit 20 of the network relay device 1c having received the FDB flush frame then rewrites an FDB_ID value in FDB_ID table 310 provided in the network relay device 1c into another value. Likewise, frame determination unit 20 of the network relay device 1d having received the FDB flush frame then rewrites an FDB_ID value in FDB_ID table 310 provided in the network relay device 1d into another value. After a specified period of time passing, central control units 50 of the network relay devices 1c and 1d erase the registered contents of FDBs 300, respectively.

Advantages of the Embodiment

Since, when determining that a communication failure has occurred in network 2, network relay device 1 in this embodiment rewrites an FDB_ID value associated with the registered contents to be erased into another value without erasing the registered contents of the FDB, the new FDB_ID value allows a quick start of source address learning and destination address retrieval. That is, network 2 using network relay device 1 in this embodiment allows essentially the same function as the function of erasing the registered contents to be realized by rewriting an FDB_ID value in FDB_ID table 310 into another value, even without erasing the registered contents of FDB 300, and the period of time until performing essentially the same function as the function of erasing the registered contents of FDB 300 can therefore be shortened even when applying network 2 with network relay device 1 to a backbone. Accordingly, network 2 in this embodiment can, even in the event of a communication failure in the network 2, reduce the effect on the period of time of route switching (i.e. the effect causing a long period of time of route switching and therefore requiring a long period of time of restoring the communication failure).

Although in this embodiment, the network relay device to be used in a ring network has been described as erasing the registered contents of the FDB in the event of a communication failure, a network relay device in a modification to this embodiment is not limited to the above embodiment, but may also be applied to the case of erasing the registered contents of the FDB for a specified port of the network relay device.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A network relay device, comprising:
    a transmit/receive unit having plural ports;
    a forwarding database (FDB) for storing as its registered contents at least:
    a port identifier for identifying each of the plural ports or a link aggregation group (LAG)_port into which are grouped a specified number of the plural ports;
    a terminal identifier for identifying a terminal; and
    an FDB_ID for being associated with both the port identifier and the terminal identifier; and
    an FDB_ID table for storing a value of the FDB_ID associated with the port identifier, along with an identification of the port identifier,
    wherein, when a command is generated to erase the registered contents of a specified port or LAG port stored in the FDB, the value of the stored FDB_ID associated with the port identifier identifying that port or LAG port is rewritten as another value, while retaining the FDB ID value stored in the FDB.

2. The network relay device according to claim 1, further comprising:
a forwarding unit for forwarding information, the forwarding unit forwarding the information to the transmit/receive unit as a unicast when the value of the FDB_ID stored in the FDB_ID table and associated with the port identifier stored in the FDB and associated with destination information contained in that information is being stored in the FDB at the same value, or the forwarding unit forwarding the information to the transmit/receive unit as a flooding when that FDB_ID is not being stored in the FDB at the same value.

3. The network relay device according to claim 2, wherein an FDB_ID stored in the FDB_ID table and associated with a port identifier identifying one port or LAG port of the transmit/receive unit having received the information is registered in the FDB, together with source information indicative of a source of the information received in the one port or LAG port.

4. The network relay device according to claim 3, wherein when one port or LAG port of the plural ports receives erase command information for commanding an erasure of the contents stored in the FDB, the FDB_ID value stored in the FDB_ID table and associated with the port identifier identifying the one port or LAG port is rewritten as the another value.

5. A ring network, comprising:
plural network relay devices each comprising a transmit/receive unit having plural ports;
a forwarding database (FDB) for storing as its registered contents at least:
a port identifier for identifying each of the plural ports or a link aggregation group (LAG)_port into which are grouped a specified number of the plural ports;
a terminal identifier for identifying a terminal; and
an FDB _ID for being associated with both the port identifier and the terminal identifier; and
an FDB_ID table for storing a value of the FDB_ID associated with the port identifier, along with an identification of the port identifier,
wherein, when a command is generated to erase the registered contents of a specified port or LAG port stored in the FDB, the stored FDB_ID value associated with the port identifier identifying that port or LAG port is rewritten as another value, while retaining the FDB ID value stored in the FDB.

6. The ring network according to claim 5, wherein when one network relay device of the plural network relay devices transmits erase command information for commanding an erasure of the contents stored in the FDB of each of the other network relay devices, from one port or LAG port of that one network relay device to another port or LAG port of each of the other network relay devices, the other network relay devices each receive the erase command information, and rewrite the FDB_ID value as the another value.

7. A method of controlling transmissions in a network relay device, the method comprising:
storing, as registered contents in a memory in the network relay device serving as a forwarding database (FDB), at least:
a port identifier for identifying each of plural ports of the network relay device or a link aggregation group (LAG) port identifier into which are grouped a specified number of the plural ports;
a terminal identifier for identifying a terminal; and
an FDB_ID value being associated with the port identifier and the terminal identifier;
storing, as contents in a memory serving as an FDB_ID table:
the port identifiers, as registered in the FDB; and
the FDB_ID values associated with each port identifier, as registered in the FDB;
periodically generating a continuity check message (CCM) to confirm a communication connection for each port of the plural ports of the network relay device; and
when a command is generated to erase the registered contents of a specified port or LAG port stored in the FDB as a result of determining a communication connection failure from the CCM testing, rewriting the value of the stored FDB_ID associated with the port identifier identifying that port or LAG port to a new value in the FDB_ID table, while retaining the FDB_ID value stored in the FDB.

8. The method of claim 7, further comprising entering into a flooding mode if the FDB_ID value stored in the FDB for a port identifier differs from the FDB_ID value stored in the FDB_ID table for that port identifier.

* * * * *